United States Patent Office 3,699,030
Patented Oct. 17, 1972

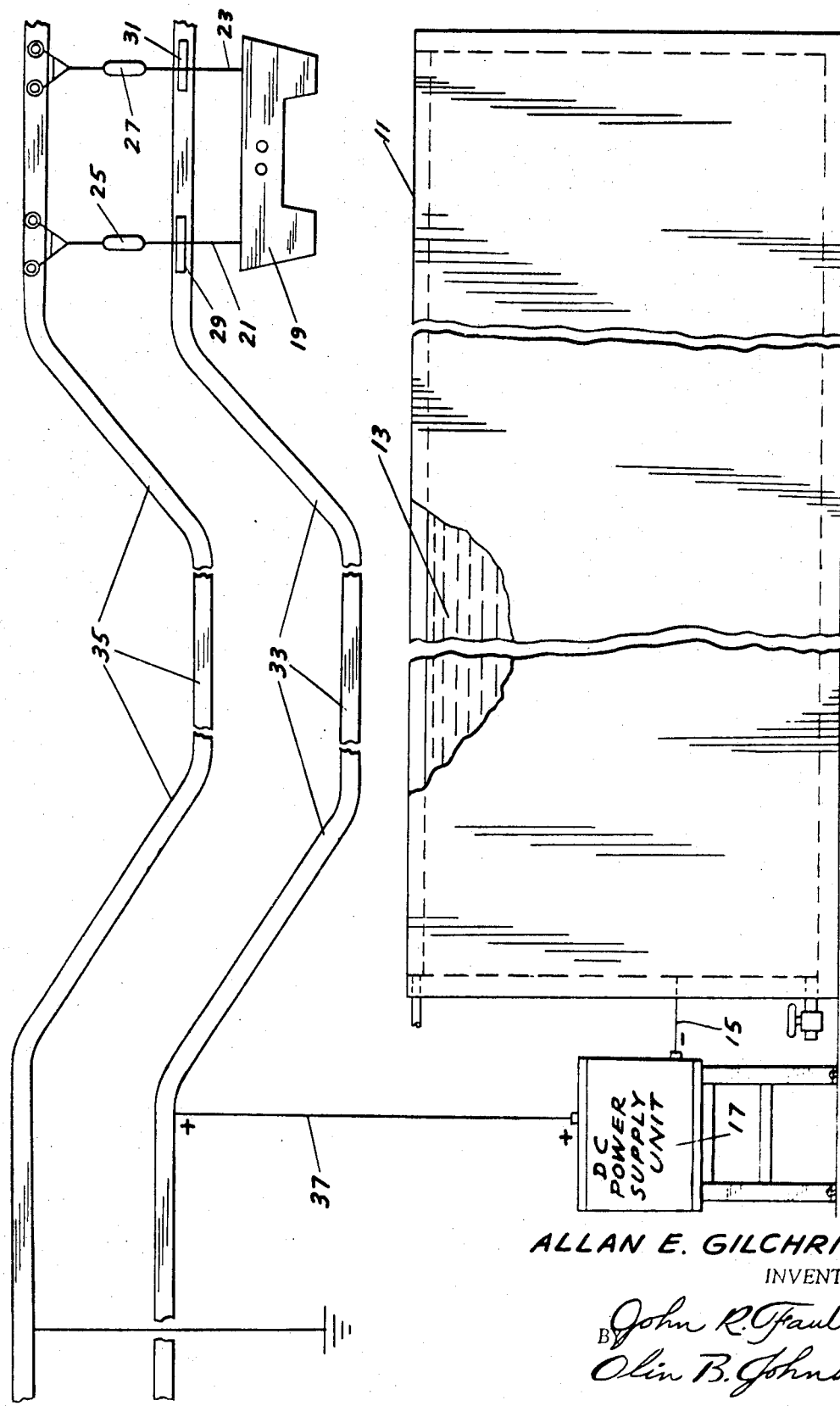

3,699,030
PROCESS FOR ELECTRODEPOSITING PAINT
Allan E. Gilchrist, Westlake, Ohio, assignor to Ford Motor Company, Dearborn, Mich.
Continuation-in-part of application Ser. No. 518,620, Jan. 4, 1966, now Patent No. 3,532,613, which is a continuation-in-part of application Ser. No. 375,633, June 16, 1964, now abandoned, which is a continuation-in-part of applications Ser. No. 304,297, Aug. 14, 1963, now Patent No. 3,230,162 and Ser. No. 273,270, Apr. 16, 1963, now abandoned. Said application Ser. No. 304,297 is a continuation-in-part of application Ser. No. 249,812, Jan. 7, 1963, now abandoned, which is a continuation-in-part of application Ser. No. 186,320, Apr. 10, 1962, now Patent No. 3,351,575, and applications Ser. No. 132,303, Aug. 18, 1961, Ser. No. 183,024, Mar. 28, 1962, Ser. No. 186,496, Apr. 10 1962 Ser. No. 202,691, June 15, 1962, and Ser. No. 218,575, Aug. 22, 1962, all abandoned. Said application Ser. No. 273,270 is a continuation-in-part of said applications Ser. No. 249,812 and Ser. No. 258,913, Feb. 15, 1963, now abandoned, which in turn is a continuation-in-part of said applications Ser. No. 249,812, Ser. No. 186,320, Ser. No. 132,303, Ser. No. 183,024, Ser. No. 186,496, Ser. No. 202,691, and Ser. No. 218,575. This application Dec. 18, 1969, Ser. No. 886,278
The portion of the term of the patent subsequent to Jan. 9, 1985, has been disclaimed
Int. Cl. B01k 5/02; C23b 13/00
U.S. Cl. 204—181
4 Claims

ABSTRACT OF THE DISCLOSURE

An improved process for anodic electrodeposition of paint comprises in combination the steps of limiting the infusible, particulate pigment used in the replenishment feed to an average particle size limit not substantially in excess of 2 microns, replenishing the bath at a rate that limits the concentration of paint solids in the coating bath to the range of about 5 to about 15 weight percent thereof, limiting the immersion of the workpiece to a time in the range of about 1 to about 3 minutes while coating current is being passed through the bath and between the workpiece anode and a cathode in contact with the bath, limiting the temperature of the coating bath during coating to the range of about 20° to about 35° C., and curing the resultant deposit of paint upon the workpiece at a temperature in the range of 120° to 200° C. In one preferred embodiment, at least 95 percent of the pigment particles have particle size limit of less than 2 microns. In a second preferred embodiment, the replenishment feed is controlled so that the binder resin to pigment ratio in the replenishment feed is lower than the corresponding ratio existing in the bath being replenished.

This application is a continuation-in-part of my copending U.S. patent application Ser. No. 518,620 filed Jan. 4, 1966, now U.S. Pat. No. 3,532,613. Application Ser. No. 518,620 is a continuation-in-part application of my copending U.S. patent application Ser. No. 375,633 filed June 16, 1964 and now abandoned. Application Ser. No. 375,633 is in turn a continuation-in-part of my copending U.S. patent application Ser. No. 304,297, filed Aug. 14, 1963, now U.S. Pat. No. 3,230,162 and my copending U.S. patent application Ser. No. 273,270, filed Apr. 16, 1963 and now abandoned. Application Ser. No. 304,297 is in turn a continuation-in-part of my copending and now abandoned U.S. patent application Ser. No. 249,812, filed Jan. 7, 1963 which was a continuation-in-part of my copending U.S. patent application Ser. No. 186,320, filed Apr. 10, 1962, now U.S. Pat. 3,351,575, and my copending and now abandoned U.S. patent applications Ser. Nos. 132,303, filed Aug. 18, 1961; 183,024, filed Mar. 28, 1962; 186,496, filed Apr. 10, 1962; 202,691, filed June 15, 1962; and 218,575, filed Aug. 22, 1962. Application Ser. No. 273,270 is in turn a continuation-in-part of my copending and aforementioned U.S. patent application Ser. No. 249,812 and my copending and abandoned U.S. patent application Ser. No. 258,913, filed Feb. 15, 1963. Application Ser. No. 258,913 is a continuation-in-part of my aforementioned and copending U.S. patent applications Ser. Nos. 249,812; 186,320; 132,303; 183,024; 186,496; 202,691 and 218,575. The disclosures of these applications are incorporated herein by reference.

BACKGROUND OF THE INVENTION

Electrodeposition of paint employing particulate pigment and polycarboxylic acid resin binder are disclosed in my U.S. Pat. 3,230,162. As aforementioned, this application is a continuation-in-part of copending U.S. patent application Ser. No. 518,620 which in turn is a continuation-in-part of copending U.S. patent application Ser. No. 375,633, now abandoned, which in turn is a continuation-in-part of my copending U.S. patent application Ser. No. 304,297 from which my aforementioned U.S. Pat. 3,230,162 issued.

THE INVENTION

I have found that very small particle size of all of the component pigments is essential for films of superior durability. This is quite in contrast with conventional painting formulations which frequently incorporate component pigment solids of average size well above this with quite good success, for example, component pigments having about 10–30 microns average, and up to about 44 microns.

Preferably, for best performance, the average particle size of each such infusible pigment component should be not substantially greater than about 2 microns for my purposes. The pigment sizes I describe here are for equivalent spherical diameters.

The major reasons for limiting such pigmentation strictly to such critically fine sizes are these: (1) the comparatively high viscosity of a freshly-electrodeposited resin substantially restricts diffusion, mobility or leveling of the codeposited pigment in the electrodeposited film even when it is cured at an elevated temperature in the range of 120° to 260° C. or higher, (2) the critically small particle size pigment is distributed much more uniformly than coarser material from top to bottom in the electrodeposited film; and (3) there is some resin binder enrichment at the base of the film in contact with the anode which enrichment is especially pronounced when coarser pigments are present and not particularly significant when using the critically smaller sized pigments. In addition to being essential for forming superior film in this type of electrocoating, the small size pigment provides for easy mechanical suspension during the coating operation and easy redispersion after settling following a shutdown period.

When a component pigment is fairly dense, e.g., above about 3.5 relative to water, use of a low average particle size of such component pigment not substantially in excess of about 2 microns is particularly advantageous for my purposes. When the component pigment has a lower density than this, the average particle size limit can approach about 5 microns without substantial sacrifice in performance. However, particle size of the component pigment is preferably below about 2 microns even with the less dense pigments. When infusible pigments are available that have substantially no particles larger than about 2 microns, the use of such pigments is preferred. However, as many useful pigment components are comminuted from larger particles and then subject to imperfect or incomplete classification procedures, if any, it is usually not economical or practical to remove or avoid minute amounts of oversize material. Thus, as much as about 5% and preferably not more than about 2% by weight of an infusible component pigment can be oversize, that is above 2 microns, without substantial sacrifice in performance.

In this type of painting process, the film-forming polycarboxylic acid binder resin has the attributes of a solute in the bath as distinguished from a latex, the bath viscosity builds up substantially with increasing resin concentration. Extremely low concentrations of polycarboxylic acid binder resins give very poor electrodeposition with respect to evenness, smoothness, and adhesion. The small particle size pigments also tend to thicken the bath. The bath should be limited to a concentration of about 5 to about 15, preferably 5 to 12, percent by weight of painting solids (N.V.M.) for best painting performance. Thus the bath advantageously contains between about 85 and about 95% water. Replenishment of bath components is carried out continuously or intermittently at a rate sufficient to maintain the concentration of painting solids within the aforemetioned range.

Electrocoating or electropainting in accordance with the process of this invention is carried out at an impressed potential above the threshold deposition voltage characteristic of the acid resin employed, i.e., the voltage at which deposition of the dispersed resin is initiated upon an electrically conductive workpiece when a direct electric current is passed through the bath between the workpiece and a second electrode that is electrically negative in relation to the workpiece, spaced apart from the workpiece, and in contact with the bath. The maximum tolerable voltage is slightly below the rupture voltage of the resin employed, i.e., that voltage at which a resin film already laid down by this method ruptures upon continued application of such voltage during the immersion of the workpiece for coating. With coating compositions now available, the threshold voltage is as low as about 15–20 volts. A practical rate of deposition requires a voltage in excess of 50 volts and industrial processes usually employ voltages between 100 and 500 volts, more commonly above 150 volts. However, continued improvement in these paints has made available paints that will permit the use of voltages substantially above 500 volts, e.g., 600 to 900 volts. Continued improvement of such paints can be expected to raise this upper level even more as formulators strive for greater "throw," i.e., the ability of a paint system to effectively coat areas on complex objects which are recessed or otherwise electrically shielded.

For best film deposition, bath temperature is maintained in the range of 20° to 35° C. The bath is continuously agitated to maintain substantially uniform temperature of the anode surfaces, to assist suspension of insoluble solids, and to help disperse high solids replenishment feed.

Under the foregoing conditions the operating immersion time, i.e., immersion under impressed coating voltage, is advantageously between about 1 and about 3 minutes.

Films thus prepared and employing pigments of the aforementioned critical particle size are advantageously cured at temperatures in the range of about 120° to 260° C., preferably 120° to 200° C. While the choice of temperature within such range and curing times at such temperature will vary somewhat with the paint used, the film depth, and the intended end use of the coated product, a metal temperature within such range is maintained for a time in the range of about 2 to about 20 minutes.

DETAILED DESCRIPTION OF THE INVENTION

Electrocoating in accordance with this invention is from an aqueous bath containing an intimate dispersion of infusible pigment, a polycarboxylic acid resin, i.e., a resin having free or unreacted carboxyl groups its molecular structure prior to dispersion which are derived from an acidic constituent monomer (carboxylic acid or anhydride), and a water soluble base which serves as a resin dispersal assistant.

At least the major fraction of the primary or binder resin employed in this process is a synthetic polycarboxylic acid resin. The binder resin serves as a binder for infusible pigment, i.e., mineral pigment or organic particles that are infusible at the curing temperature. The preferred polycarboxylic acid resins have an electrical equivalent weight between about 1,000 and about 20,000 and an Acid Number between about 30 and about 300. The preferred polycarboxylic acid resins within the aforementioned ranges are disclosed in my U.S. Pat. 3,230,162.

Advantageously, the polycarboxylic acid resin comprises a coupled siccative glyceride oil reacted under substantially anhydrous conditions with about 2–25% of a polymerizable vinyl monomer. In some cases vinyl polymers such as dicyclopentadiene resins can be used to replace part or all of the vinyl monomer to raise the electrical equivalent weight of the acid resin. Preferably, the vinyl monomer is vinyl toluene limited to about 15% maximum on the weight of the coupled oil, and this resin is extended with non-heat reactive phenol aldehyde resin at an elevated temperature sufficiently long to achieve ostensible chemical union between polycarboxylic acid resin and this extender so that there is no appreciable dissociation of acid resin and extender in a sustained electrocoating operation, and the product can be considered as a compound rather than a mixture of two compounds. Other extender resins and film plasticizers which coalesce on the anode during the electrodeposition to become effectively part of the paint binder at that stage can be used as a minor fraction of the film-forming binder. The concentration of such materials should be limited so as not to mask the unique electrical migration characteristics and structural anionic polyelectrolyte behavior of the principal and essential acid resin binder. For best electrodeposition performance, my film-forming binder consists essentially of synthetic polycarboxylic acid resin of the controlled high electrical equivalent weight. The useful binder compositions are film-forming at the electrodeposition bath temperature and are curable to a tack-free film, as for example, by baking at a temperature of 120° to 260° C., preferably 120° to 200° C. for about 2–20 minutes. Before curing they hold solid phase substances tenaciously to the anode. These features are discussed at length in my U.S. Pat. 3,230,162.

Other suitable synthetic polycarboxylic acid resins for my binders include, for example, alkyd resins and acrylic acid and lower alkyl ($C_{1-4}$) substituted acrylic acid containing polymers, i.e., those having carboxyl groups contributed by alpha, beta carboxylic acids or residues of these acids, having a comparatively high electrical equivalent weight. The comparatively high electrical equivalent weight of the useful synthetic polycarboxylic acid resins for my purpose causes them to convert from dispersed current-carrying anions in the bath to a water resistant and electrically resistant material upon electrodeposition. Their electrical equivalent weight should not be over 20,000 for ease of dispersion and efficiency of operation. The preferred synthetic polycarboxylic acid resins for my purpose have electrical equivalent weight between about 1,000 and 2,000 for deposition of films approaching about 25–50 microns in practical short operating times, e.g., 1–3 minutes. Where a thinner film is desired the electrical equivalent weight advantageously can be as high as about 5,000.

In addition to use of resinous extenders and film plasticizers of conventional nature, the binder resin can have mixed with it between about 0.1 and about 10%, basis weight of the polycarboxylic acid resin in the bath, of a nonionic organic liquid compatible with the resin in the bath dispersion as a solubilizing assistant or, more accurately, dispersion modifier as shown in my U.S. Pat. 3,230,-162. Preferably, these volatilize from the electrodeposited film on forced curing. The proportion of such nonionic organic liquid assistant should be insufficient to form a distinct phase in the bath composition. Typical assistants are: petroleum naphthas, specifically aliphatic napthenic and aromatic hydrocarbons or mixtures of same having boiling point between about 30° C. and about 240° C., and preferably between about 150° and 200° C. so that they will volatilize from the film on baking or other curing such as air curing; pine oil; glycerine, water soluble alkoxy alkanols such as 2-butoxy-ethanol-1 and other ethylene oxide derivatives of this type, and monoalkyl ethers of glycols such as the monobutyl ether of diethylene glycol. Usually 0.1–6% basis polycarboxylic acid binder resin in the bath is adequate for all purposes.

Additionally, I can use about 1–20% if desired, and most suitably not more than about 5–15%, basis weight of the polycarboxylic acid binder resin, of a polybasic carboxylic acid of molecular weight below 1,000 for an amine scavenger. Advantageously, such scavening acids are polymers of polyenoic acid having 12–44 carbon atoms, preferably the so-called "dimer" acids which are predominantly the dime rof $C_{18}$ unsaturated fatty acids, principally linoleic with some trimer present. These form soaps readily with polyamines at temperatures below about 75° C. and upon codeposition with the film and curing can provide a polyamide material in the resulting film. Those of elevated boiling point such as the "dimer" acids also can help to plasticize the film and to assist in giving good bond to a subsequent paint coating applied by dip, spray, brush, or roll when the electrically deposited undercoat has been subjected to "overbaking" exposure to a temperature of about 175°–260° C., which usually detracts from the intercoat adhesion.

A water soluble base is employed as a resin dispersal assistant by neutralizing at least a portion of the free carboxyl groups on the binder resin. The most preferred of all the water soluble bases which can be used in the electrodeposition of paint comprising polycarboxylic acid resins are the water soluble amines. Ammonia can be used but is less desirable due to its volatility. From the earliest prior art of electrodeposition of organic materials, it is known that inorganic bases can also be used. The stronger inorganic bases however can deleteriously affect the stability of the bath resin with time and the inclusion of occluded amounts of such bases in the deposited paint is undesirable where corrosion resistance of the painted product is important. Such bases include potassium hydroxide, lithium hydroxide, sodium hydroxide, etc.

The useful amines in my bath composition and replenishment composition therefor are the water soluble amino compounds as described and set forth in my U.S. Pat. 3,230,162, preferably with 30–60% of the amino equivalents present being contributed by water soluble polyamine. Advantageously, pH of the bath composition is not more than about 8.3 to suppress sorption of $CO_2$ from ambient air, and generally it will be broadly between about 5 and 8.2 at room temperature. Operation of the process is not limited to the aforementioned pH range and a pH of as high as 9 or 10 is not uncommon in industrial electrocoating tanks.

Specific resistance of the bath composition as made up is advantageously between about 700 and about 1,000 ohm-centimeters to deposit about 25 microns thick as a priming coat, while a high bath resistance gives a thinner film and vice versa. Upon electrodeposition, I estimate that the film should have at least about 40,000,000 ohm-centimeters apparent specific resistance to obtain good throw into interstices and limitation of film thickness to comparatively thin values as electrodeposition proceeds. Advantageously, this apparent specific resistance of film is even higher, preferably at least about 75,000,000 ohm-centimeters for film less than 25 microns thick. Such apparent specific resistance include a surface resistance factor for the bath-deposited film interface and the film-substrate interface.

In some of my painting compositions, the pigmentation can be with a single component pigment, e.g., a pigmentary grade of titanium dioxide, but more generally the overall pigmentation is made from a plurality of component pigments to achieve various special properties, colors, economies, sag resistance, etc. My electrocoating bath composition advantageously has a binder resin-to-pigment ratio of at least about 2:1 by weight to yield a film which does not appear to be dried out and chalky and thus have impaired strength and corrosion resistance. Advantageously, for efficiency and obtaining the best quality electrodeposition, the binder resin-to-pigment ratio in the bath composition, is at least about 2.5:1. I have used successfully binder resin-to-pigment ratios as high as 50:1 and even higher, and the ratio can be as high as about 100:1 and higher and still be in a compositional range wherein pigment effects are consequential and important, e.g., for color, resistance to film degradation, apparent bodying, corrosion resistance, etc.

Especially pertinent in this regard is my finding that component pigment solids sustained in my electrocoating bath migrate to the anode more rapidly in the electrocoating operation than does my binder resin when both are considered in bulk, the resin having roughly 70–80% and typically about 75% of the apparent velocity of the pigment. This is shown by a significantly lower weight ratio of film-forming binder resin-to-pigment in the resulting film electrodeposited on the anode than the film-forming binder resin-to-pigment weight ratio of the bath suspension. The ratio in the deposited film is broadly dependent upon and appreciably lower than the concentration of binder resin-to-pigment in the operating bath from which it is deposited. Because of this disproportionate deposition of resin and pigment, establishment and maintenance of a proportion of binder resin relative to pigment in the bath above that desired in the electrodeposited film is essential to obtain consistent pigmented film quality, and because the disproportionation is in the direction of dried-out, chalky film formation, the maintenance of the ratio becomes quite critical when the lower limiting binder resin-to-pigment ratio is approached to obtain especially durable films from the resin and pigment selected for a standarized operating condition. This is contrary to my experience with conventional pigmented painting compositions wherein weight ratios of binder resin-to-pigment often can be below 1:1 with good film formation and there is no disproportionation factor to be considered.

In my painting bath composition the film-forming binder resin-to-pigment ratio generally is between about 1.25 and 1.4 times that of the film desired to be deposited because of the disproportionation effect. As the kind of binder resin and pigment used and the operating conditions of temperature and voltage can be varied substantially from one particular electrocoating operation to another, it is particularly advantageous to predetermine, e.g., in a small scale trial, a particular resin-to-pigment ratio for the bath, not lower than about 2:1, necessary for electrodepositing a film therefrom having a desired resin-to-pigment ratio under the particular electrocoating conditions selected.

In practice I generally replenish the bath gradually, that is, continuously or incrementally, with a replenishment composition comprising said binder resin and pigment proportioned to maintain the resin-to-pigment ratio of the bath approximately at the elevated predetermined value, the total replenishment being substantially equal over a sustained operating period to the amount of the binder resin and pigment deposited on the anodes coated. The high solids content replenishment composition for dispersion into my painting composition comprises the intimate mixture of the aforesaid pigment and binder resin in a resin-to-pigment ratio of at least about 1.5 (plus or minus 0.1):1, this ratio being the approximate lower limit for maintaining the electrocoating bath in sustained operation in a manner to preclude the electrodeposition of chalky, binder-starved appearing films. Advantageously, the ratio is even higher for insuring good film quality conveniently with control tolerance, e.g., at least about 2:1.

The component pigments of my compositions, and by pigment I mean to include for my purposes solid phase fillers as well, are infusible upon subsequent curing. Generally the component pigments are mineral in nature, for example, titanium dioxide, zinc oxide, leaded zinc oxide, white lead, titanium calcium (a composition of titanium dioxide and calcium sulfate), clays such as kaolinite, silica, talc, mica, wollastonite, calcium carbonate, barium sulfate, ferrite yellow oxide, ferric oxide, "brown" iron oxide (which is a blend of red, yellow and black iron oxides), tan oxide of iron (which is a similar blend), ultramarine blue, raw sienna, burnt sienna, raw and burnt umber, chromium oxide green, graphite, carbon black, zinc chromate, lampblack, calcium phosphate, calcium lead chromate, calcium phytate, chrome orange, cadmium reds and yellows, alumina, and elemental metal powders such as zinc, aluminum, magnesium, and copper. It is advantageous that water soluble salts in the pigments, such as sodium or potassium salts, are very low and preferably absent so that the electrical resistance of the bath and the film deposition is not subject to uncontrolled variation, and that the primary control of electrical conductance is by means of the binder resin and amino compound dispersed in the bath.

The component pigments can also be organic such as the green iron salt of nitroso beta naphthol, copper phthalonitrile blue, toluidine red, parachlor red, para toner (red), alkali resistant red, BON red and maroon, Wachtung red, madder lake red, Duratone red, carmine red, and Hansa yellows.

The high solids content replenishment composition for sustained operation of the painting bath preferably is, on a pigment and filler free basis, between about 40 to 95%, preferably 50 and 95%, by weight film-forming (straight or extended) resin binder, the upper concentration being so limited to avoid extremely refractory handling properties, and the lower for economy and avoiding the handling of a good deal extra water. While the bath can be replenished with an intimate mixture of pigment and film-forming binder resin, considerable mechanical work is required to achieve the incorporation of that material; accordingly, I have found it advantageous to use up to about 2 parts by weight of water per part of binder resin plus pigment for the replenishment composition.

Preferably, the replenishment composition also contains a small amount of water soluble amino compound such as a water soluble monoamine, e.g., up to about 10% basis weight of the binder resin and more preferably about 1–3% to assist in dispersing the replenishment composition into the bath. Such amino compound in the replenishment composition also assists in hydrating any anhydride groups that are present in conjunction with water in the replenishment composition, thus enhancing its dispersibility in the bath. The replenishment composition also can contain for efficiency and convenience, in addition to a controlled proportion of binder resin and pigment, water-soluble amino compounds, the small desirable proportions hereinbefore stated of nonionic organic liquid solubilizing assistant and low molecular weight polycarboxylic acid amine scavenger so that the replenishment operates to keep the bath in compositional balance in all respects.

Referring to the accompanying schematic drawing depicting one embodiment of apparatus suitable for carrying out the method of this invention, there is shown a steel tank 11 which contains a painting bath 13 and serves as a negative electrode in the coating process. Tank 11 is electrically connected to D.C. power supply unit 17 via conductor 15. An article to be coated 19, e.g. an automobile body, is shown suspended from a conveyor 35 by hangers 21 and 23. Conveyor 35 is a conventional, electrically powered, chain driven conveyor constructed and arranged for the transportation of articles to be coated through bath 13. Hangers 21 and 23 include insulators 25 and 27, respectively, which insulate article 19 from the grounded conveyor. Contact plates or brushes 29 and 31 are attached to and in electrical connection with hangers 21 and 23, respectively. Article 19 is shown approaching bath 13 and in electrical connection with bus bar 33 which in turn is in electrical connection with D.C. power supply unit 17 via conductor 37. Article 19, therefore, serves as the positive electrode of an electrodeposition cell while the article is passing through bath 13.

It is to be understood that bus bar 33 may be segmented and that certain of the various segments may have no connection with the power supply unit or may be adapted for polarity reversal to provide additional control over the coating process.

Power supply unit 17 is constructed and arranged to provide between the electrodes and through the coating bath a direct current flow of electrical energy that is commensurate with the size of the electrocoating operation contemplated. Design of the power supply unit should take into consideration the surface area of the workpieces that will be in residence within the coating bath at any given time, the workpiece surface area entering the bath per unit time, the deposition properties of the coating formulation, the conductivity of the coating bath, the thickness of the coating to be formed, etc. Ordinarily, such current will be provided by rectification of an alternating current power source by conventional means.

The following examples show ways in which my invention can be practiced, but should not be construed as limiting the invention. The electrical equivalent weights of the polycarboxylic acid resin binders are between 1000 and 2000. All parts are parts by weight and all percentages are weight percentages in this application unless otherwise expressly indicated.

EXAMPLE 1

A paint binder is made by reacting in an agitator tank 8,467 parts of alkali-refined linseed oil and 2,025 parts of maleic anhydride (heated together at 232.2° C. for about three hours until an Acid Value of 80–90 results), then cooling this intermediate to 157.2° C., adding 1,789 parts of vinyl toluene containing 48 parts of ditertiary butyl peroxide and reacting at 216° C. for about an hour. It has Acid Number of 75–85 at this stage. The resulting vinyl toluenated material is then cooled to 190° C. and 2,647 parts of non-heat reactive, thermoplastic, oil-soluble phenolic resin are added, the temperature goes to 177° C. and the mixture held one hour to unite the acid resin and extender, then cooled to about 150° C. and strained. The phenolic resin is a solid lump resin having softening point of 120–140° C., specific gravity of 1.03–1.05 at 20° C., and has been stripped to get out excess phenol and low molecular weight materials. It is a condensation product of about equimolar quantities of para tertiary butyl phenol and formaldehyde. The electrical equivalent weight of the resulting acid resin as extended is about 1400.

A thick blend is then made by mixing together 2,400 parts of the foregoing extended acid resin with 211 parts of water, and 29 parts of triethylamine, then adding and mixing in 25 parts of mineral spirits, a light hydrocarbon liquid having API gravity of 45–49.5, specific gravity at 15.6° C. of 0.78–0.80, flash point (Cleveland Open Cup) between 37.8 and 46° C., a negative Doctor test and no acidity, 50 parts of 2-butoxyethanol, 100 parts of pine oil, 15 parts of antifoam agent (a ditertiary acetylenic glycol with methyl and isopropyl substitution on the tertiary carbon atoms), and 1,615 parts of pigment grind.

The pigment grind is made of 497.1 parts of fine kaolin clay having average particle size of 0.55 micron with particle size distribution as follows: 95% less than 2 microns, 50% less than 0.55 micron, 20% less than 0.35 micron; 243 parts of pigmentary titanium dioxide having average particle size about 0.3 micron and substantially no particles as large as a micron; 16.6 parts of fine lead chromate having average particle size of 0.1–0.5 micron with less than ¼% of the particles exceeding 44 microns; 146.4 parts of fine red iron oxide having average particle size of 0.55–0.6 micron with less than ½% of the particles exceeding 20 microns; 2.8 parts of carbon black having average particle size of about 25 millimicrons with less than 0.2% particles exceeding about 44 microns; 262.5 parts of a mixture containing 104.8 parts of vinyl toluenated, maleic coupled linseed oil made in the same manner as the resin hereinbefore shown in this example (except that the resulting polycarboxylic acid resin is not extended with any phenolic resin), 25 parts of diisopropanol amine, and 132.7 parts of water; 408.9 parts of additional water; 1.7 parts of the acetylenic glycol antifoam agent referred to above; and a mixture of 18 parts of diisopropanol amine and 18 parts of water.

The resulting thick blend, 4,445 parts, is mixed with 3,517 parts of water and 500 parts of a neutralizing solution consisting of 12.4% diethylene triamine, 43.8% diisopropanol amine, and 43.8% water to yield 8,462 parts of heavy paint having about 40.7% total solids (N.V.M. after 20 minutes at 176.7° C.). To this body of heavy paint is added 29,804 parts of water to yield a bath dispersion of 38,266 parts having 9% total solids by weight. For practical estimation purposes the non-volatile matter can be taken as the resins plus pigments, and all else can be considered volatile.

The cathode is an agitated metal tank holding 1,000 parts of the bath composition at 9% solids and surrounding the anode with about 2.5 cm. clearance at the sides and bottom. The anode is a 0.102 meter x 0.102 meter square of 24 gauge sheet steel. Voltage across anode to cathode is constant at 350. The anode linear insertion rate is 0.3 meter per minute, and the anode immersed to a depth of .089 meter. In the painting operation the tank temperature is controlled between 21° and 35° C. The specific resistance of the bath initially is 750–1050 ohm-centimeters.

The resulting coated anode is removed from the bath with power on after 60 seconds have elapsed. The anode coating has resin-to-pigment ratio of about 2.1:1, whereas the original bath dispersion has resin-to-pigment ratio of 2.8:1 and is of sufficient volume to remain substantially constant, although decreasing very slightly, during the one-minute run.

The anode is baked for 15 minutes at 176.7° C. The coating before baking has no visible surface irregularities, and the film is slightly tacky. Adhering droplets are blown off with air. After baking the film exhibits excellent adhesion and is pore free and durable, exhibiting standard salt spray resistance in excess of 250 hours. The cured paint film is smooth, even, of uniform sheen, and about 25 microns thick.

For sustaining this operation, a high painting solids content (74.5%) replenishment composition is made like the foregoing thick blend except that 2,185 parts of the pigment grind is used, the weight ratio of binder resin-to-pigment being 2.1:1.

A succession of panels are electrocoated like the first one. For every 10 parts of paint solids deposited on the panels about 13.4 parts of the replenishment composition and 0.275 part of aqueous amine solution (12.4% diethylene triamine, 43.8% diisopropanol amine, and 43.8% water) are stirred into the bath to maintain both solids content between 8 and 9%, with a small amount of additional water being added periodically to maintain bath volume essentially constant for evaporation and entrainment losses. The electropainting and curing operations yield a series of panels essentially of the same good quality as the first one and substantially consistently having a binder resin-to-pigment weight ratio of about 2.1:1, while the binder resin-to-pigment weight ratio in the bath composition is thus maintained at about 2.8:1.

EXAMPLE 2

An acrylic resin is made by slowly adding a mixture of 60 parts of butyl acrylate, 25 parts of styrene, 15 parts of methacrylic acid, 1 part of t-butyl perbenzoate, and 1 part of benzoyl peroxide into 34.7 parts of 2-butoxy ethanol maintained at 157.2–160° C. during a 2½ hour period and is held for an adidtional hour at this temperature using an agitated reactor equipped with a reflux condenser. The resulting resin is cooled to 137.8° C. and further reacted for ½ hour at 154.4° C. with 10 parts of tri-hydroxyl methyl amino methane. 500 parts of the above described acrylic resin are blended with 94.2 parts of a 50% by weight diisopropanol-amine-water solution and further reduced with water to give a 40% resin solids dispersion.

A pigment grind is made up by grinding together 79 parts of this reduced acrylic resin dispersion, 76 parts of titanium dioxide, 18.7 parts of fine kaolin clay, and 78.3 parts of water, the titanium dioxide and clay being the same kinds as used in Example 1.

A second mixture is ground together; it has 106 parts of very finely-powdered polyvinyl chloride-vinyl acetate copolymer resin having melting point about 150° C., 89.7 parts of water, and 84.3 parts of the reduced acrylic resin dispersion.

A composition for electrodeposition is made by blending together 106 parts of the pigment grind, 75.8 parts of the copolymer resin grind, 134.5 parts of the 40% solids acrylic resin dispersion, and 693.7 parts of water. It has acrylic resin to particulate solids (that in mineral pigment plus polyvinyl chloride resin) of about 1.1:1. The electrodeposition is done like that of Example 1.

When such electrocoated anode is cured at room temperature, the film is poor and chalky because the film-forming binder resin-to-pigment ratio is about 0.87:1, with the hard copolymer resin effectively acting as a component pigment in such operation. However, when the electrocoated anode is cured by baking at 176.7° C. for 20 minutes, the film smooths out to a good, serviceable film that is not chalky; it has an acrylic resin to infusible mineral pigment ratio of about 1.5:1 and this baked film is further enriched by the auxiliary binder of the hard copolymer resin to yield an overall resin-to-pigment ratio of about 2.2:1.

It will be understood by those skilled in the art that modifications can be made in the details of the examples hereinbefore set forth without departing from the spirit and scope of the invention as expressed in the claims.

I claim:

1. In a process for painting electrically conductive objects which comprises a series of immersing said objects in an aqueous coating bath in contact with a first electrode that is negative relative to the object to be coated and comprising an intimate mixture of particulate pigment and ionized, film-forming, binder resin for pigment, at least the major fracton of said binder resin being synthetic polycarboxylic acid resin, providing a direct current of electrical energy through said bath and between said first electrode and an object of said series immersed in said bath thereby electrically inducing deposition of said resin and said pigment upon said object and forming a film thereof on said object, and withdrawing the thus coated object from said bath, the improvement which comprises in combination
   (1) replenishing the painting solids content of said bath as the coating process continues with a replenishment composition comprising an intimate mixture of
      (a) particulate, infusible pigment having average particle size limit not substantially in excess of 2 microns, and
      (b) film-forming binder resin, at least a major fraction of which is synthetic polycarboxylic acid resin,
   (2) replenishing the painting solids content of said bath as the coating process continues at a replenishment rate sufficient to maintain the painting solids content of said bath in the range of about 5 to about 15 weight percent of said bath, (3) maintaining the immersion of said object in said bath for a period of time in the range of about 1 to about 3 minutes while said direct current of electrical energy is maintained between said object and said first electrode and said bath is continuously agitated, (4) maintaining the temperature of said bath during deposition of said film on said object at a temperature in the range of about 20° to about 35° C., and (5) curing the resultant electrodeposited film of paint upon said object after removal of said object from said bath by heating said film at a temperature in the range of 120° to 260° C.

2. In a process for painting electrically conductive objects which comprises immersing a series of said objects an an aqueous coating bath in contact with a first electrode that is negative relative to the objective to be coated and comprising an intimate mixture of particulate pigment and ionized, film-forming, binder resin for pigment, at least the major fraction of said binder resin being synthetic polycarboxylic acid resin, providing, a direct current of electrical energy through said bath and between said first electrode and an object of said series immersed in said bath thereby electrically inducing deposition of said resin and said pigment upon said object and forming a film thereof on said object, and withdrawing the thus coated object from said bath, the improvement which comprises in combination (1) replenishing the painting solids content of said bath as the coating process continues with a replenishment composition comprising an intimate mixture of
   (a) particulate, infusible pigment having average particle size limit not substantially in excess of 2 microns with at least 95 percent of the particles thereof having particle size limit below 2 microns, and
   (b) film-forming binder resin, at least a major fraction of which is synthetic polycarboxylic acid resin, (2) replenishing the painting solids content of said bath as the coating process continues at a replenishment rate sufficient to maintain the painting solids content of said bath in the range of about 5 to about 12 weight percent of said bath, (3) maintaining the immersion of said object in said bath for a period of time in the range of about 1 to about 3 minutes while a difference of electrical potential in excess of 150 volts is maintained between said object and said first electrode and said direct current of electrical energy is passed therebetween through said bath, and said bath is continuously agitated, (4) maintaining the temperature of said bath during deposition of said film on said object at a temperature limited to the range of about 20° to about 35° C., and (5) curing the resultant electrodeposited film of paint upon said object after removal of said object from said bath by heating said film at a temperature in the range of 120° to 200° C.

3. In a process for painting electrically conductive objects which comprises immersing a series of said objects in an aqueous coating bath in contact with a first electrode that is negative relative to the object to be coated and comprising an intimate mixture of particulate pigment and ionized, film-forming, binder resin for pigment, at least the major fraction of said binder resin having synthetic polycarboxylic acid resin, providing a direct current of electrical energy through said bath and between said first electrode and an object of said series immersed in said bath thereby electrically inducing deposition of said resin and said pigment upon said object and forming a film thereof on said object, and withdrawing the thus coated object from said bath, the improvement which comprises in combination (1) replenishing the paintaing solids content of said bath as the coating process continues with a replenishment composition comprising an intimate mixture of
   (a) particulate, infusible pigment having specific gravity above 3.5 and average particle size limit not substantially in excess of 2 microns with at least 95 percent of the particles thereof having particle size limit below 2 microns, and
   (b) film-forming binder resin, at least a major fraction of which is synthetic polycarboxylic acid resin, (2) replenishing the painting solids content of said bath as the coating process continues at a replenishment rate sufficient to maintain the painting solids content of said bath in the range of about 5 to about 12 weight percent of said bath, (3) maintaining the immersion of said object in said bath for a period of time in the range of about 1 to about 3 minutes while a difference of electrical potential in excess of 150 volts is maintained between said object and said first electrode and said direct current of electrical energy is passed therebetween through said bath, and said bath is continuously agitated, (4) maintaining the temperature of said bath during deposition of said film on said object at a temperature limited to the range of about 20° to about 35° C., and (5) curing the resultant electrodeposited film of paint upon said object after removal of said object from said bath by heating said film at a temperature in the range of 120° to 200° C.

4. In a process for painting electrically conductive objects which comprises immersing a series of said objects in an aqueous coating bath in contact with a first electrode that is negative relative to the object to be coated and which comprises an intimate mixture of particulate pigment and ionized, film-forming, binder resin for pigment, wherein the weight ratio of said binder resin to said pigment is above about 2.5:1 at least the major fraction of said binder resin being synthetic polycarboxylic acid resin, providing a direct current of electrical energy through said bath and between said first electrode and an object of said series immersed in said bath thereby electrically inducing deposition of said resin and said pigment upon said object and forming a film thereof on said object, and withdrawing the thus coated object from said bath, the improvement which comprises in combination (1) replenishing the painting solids content of said bath as the coating process continues with a replenishment composition comprising an intimate mixture of
   (a) particulate, infusible pigment having average particle size limit not substantially in excess of 2 microns, and
   (b) film-forming binder resin, at least a major fraction of which is synthetic polycarboxylic acid resin, in which the weight ratio of said binder resin to said pigment is below that of the corresponding ratio of the bath undergoing replenishment, (2) replenishing the paintaing solids content of said bath as the coating process continues at a replenishment rate sufficient to maintain the painting solids content of said bath in the range of about 5 to about 12 weight percent of said bath, (3) maintaining the immersion of said object in said bath for a period of time in the range of about 1 to about 3 minutes while a difference of electrical potential in excess of 150 volts is maintained between said object and said first electrode and said direct current of electrical energy is passed therebetween through said bath, and said bath is continuously agitated, (4) maintaining the temperature of said bath during deposition of said film on said object at a temperature limited to the range of about 20° to about 35° C., and
(5) curing the resultant electrodeposited film of paint upon said object after removal of said object from said bath by heating said film at a temperature in the range of 120° to 200° C.

References Cited

UNITED STATES PATENTS 3,362,899  1/1968  Gilchrist _____ 204—181

HOWARD S. WILLIAMS, Primary Examiner